United States Patent
Lee et al.

(10) Patent No.: US 7,317,624 B2
(45) Date of Patent: Jan. 8, 2008

(54) POWER FACTOR CORRECTION METHOD AND APPARATUS AND POWER SUPPLY USING THE SAME

(75) Inventors: Jin-hyung Lee, Incheon (KR); Kyoung-geun Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 198 days.

(21) Appl. No.: 10/854,240

(22) Filed: May 27, 2004

(65) Prior Publication Data

US 2005/0002211 A1    Jan. 6, 2005

(30) Foreign Application Priority Data

Jul. 1, 2003    (KR)    ...................... 10-2003-0044341

(51) Int. Cl.
*H02M 1/12*    (2006.01)
(52) U.S. Cl. ...................................................... 363/44
(58) Field of Classification Search ................. 363/39, 363/44, 45, 46, 47
See application file for complete search history.

(56) References Cited

U.S. PATENT DOCUMENTS

| | | | | |
|---|---|---|---|---|
| 3,913,002 A | * | 10/1975 | Steigerwald et al. | ........... 363/18 |
| 5,251,120 A | | 10/1993 | Smith | |
| 5,367,247 A | * | 11/1994 | Blocher et al. | ............. 323/222 |
| 5,459,375 A | * | 10/1995 | Nilssen | ....................... 315/247 |
| 5,617,013 A | | 4/1997 | Cozzi | |
| 5,969,962 A | * | 10/1999 | Gabor | ........................... 363/89 |
| 5,973,946 A | * | 10/1999 | Yasumura | ..................... 363/89 |
| 6,108,222 A | * | 8/2000 | Liang | ............................ 363/48 |
| 6,137,700 A | * | 10/2000 | Iida et al. | ...................... 363/89 |
| 6,222,742 B1 | | 4/2001 | Schlecht | |
| 2005/0258793 A1 | * | 11/2005 | Chin et al. | .................. 318/438 |

FOREIGN PATENT DOCUMENTS

KR    2003-0008855    1/2003

* cited by examiner

*Primary Examiner*—Adolf Berhane
(74) *Attorney, Agent, or Firm*—Stanzione & Kim, LLP (57) ABSTRACT

A power factor compensation method and apparatus adapted for use in a power supply which provides direct-current (DC) power via a capacitive input type smoothing circuit, and an improved power supply using the same. The power factor compensation method can correct a power factor in the power supply which rectifies an input alternating-current (AC) voltage and smoothes the same using the capacitive input type smoothing circuit to supply a DC voltage. The method may include rectifying the input AC voltage, cutting off a pulsating current generated in the rectifying operation at phases of about $\pi/2$ and $3\pi/2$ of the input AC voltage so that the pulsating current is not transferred to a smoothing circuit, and smoothing the pulsating current generated in the cutting-off operation. The power factor compensation apparatus does not form a peak envelope of current at phases of about $\pi/2$ and $3\pi/2$ of the input AC voltage, thereby improving a power factor and reducing a harmonic current. The power factor compensation apparatus uses a leak inductance in an AC transformer at maximum to provide a low-price power supply.

29 Claims, 9 Drawing Sheets

POWER FACTOR CORRECTION METHOD AND APPARATUS AND POWER SUPPLY USING THE SAME

CROSS-REFERENCE TO RELATED APPLICATIONS

This application claims the priority of Korean Patent Application No. 2003-44341, filed on Jul. 1, 2003, in the Korean Intellectual Property Office, the disclosure of which is incorporated herein in its entirety by reference.

BACKGROUND OF THE INVENTION

1. Field of the Invention

The present general inventive concept relates to power factor correction, and more particularly, to a power factor correction method and apparatus adapted for used in a power supply which provides a direct-current (DC) power using a capacitive input type smoothing circuit, and an improved power supply using the same.

2. Description of the Related Art

Recently, power supplies which can be stable, compact and light have been developed to be applied to factory automation devices, office automation devices, communications devices, and power systems. In addition, power factor correction and harmonics reduction become important issues in developing the power supply.

For example, European Union forcibly restricts use of current of harmonics causing an electromagnetic interference in order to enhance quality of power supplies and heighten a trade barrier to protect products made in the European countries. Japan also restricts a general voltage distortion ratio of a power system via its suppression guide line based on the IEC standards, in order to maintain a harmonics environmental target level, in which all devices generating harmonics are regulated.

Accordingly, devices which generate current of harmonics more than a restricted value recommended by an importing country cannot be exported to the importing country. In Korea, the radio wave law amended in 1992 stipulates that a person who manufactures or imports electromagnetic interference (EMI) devices is required to obtain an official approval of EMI with respect to the devices.

In general, a power supply includes a rectifier which converts an AC voltage into a DC voltage, and a DC-DC converter which stabilizes an output from the rectifier in correspondence to variation of loads and an input voltage. A capacitive input type rectifier which is widely used as a DC power supply for various electronic equipment needs a capacitor having a large amount of capacity to correspond to an instantaneous power failure or reduce a burden of the DC-DC converter by suppressing variation of an output voltage.

However, as the capacity of the capacitor becomes larger, a pulse-shaped large current is required to flow in order to store a large amount of energy in the capacitor in a short period of time. In this case, a peak value becomes five to ten times as many as an effective value. A waveform of an input current of the rectifier becomes discontinuous due to the pulse-shaped large current. The pulse-shaped large current influences EMI upon peripheral devices due to distortion of the input voltage and a harmonics component of the input current.

Many efforts have been made on a method of adding a power factor correction circuit (PFC) to a DC-DC converter in a switching power supply.

A conventional power factor correction circuit for use in a power supply is divided into a passive PFC and an active PFC.

Figure 1:
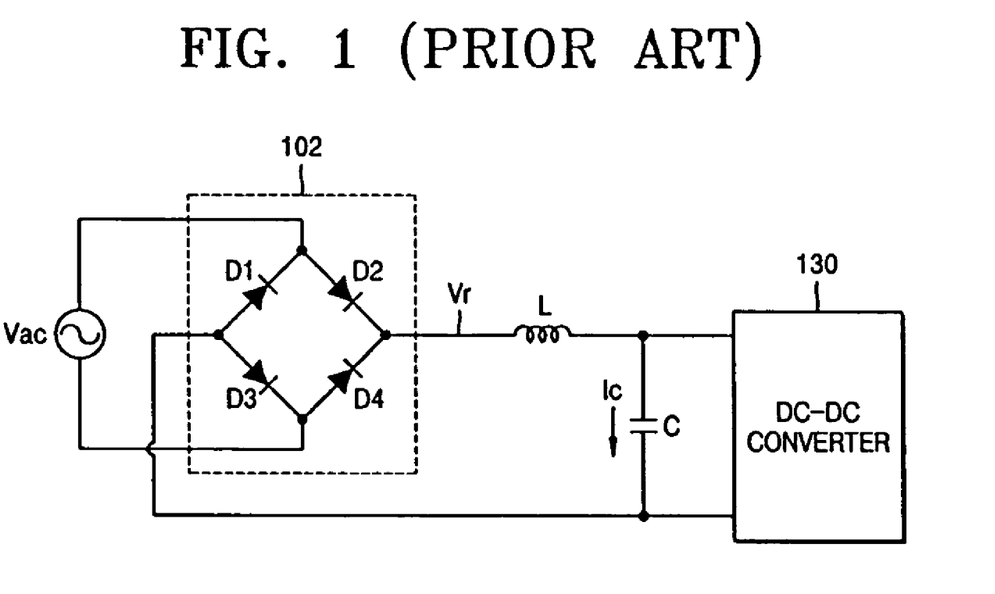
FIG. 1 is a block diagram showing a power supply to which a conventional passive power factor correction circuit is applied.

FIG. 1 is a block diagram showing a power supply to which a conventional passive power factor correction circuit is applied. In FIG. 1, an inductor L is interposed between a rectifier 102 and a smoothing capacitor C or a DC-DC converter 130 to widen a conducting angle of a charging current of a capacitor C using impedance of the inductor L, thereby enhancing power factor correction.

Figure 2A:
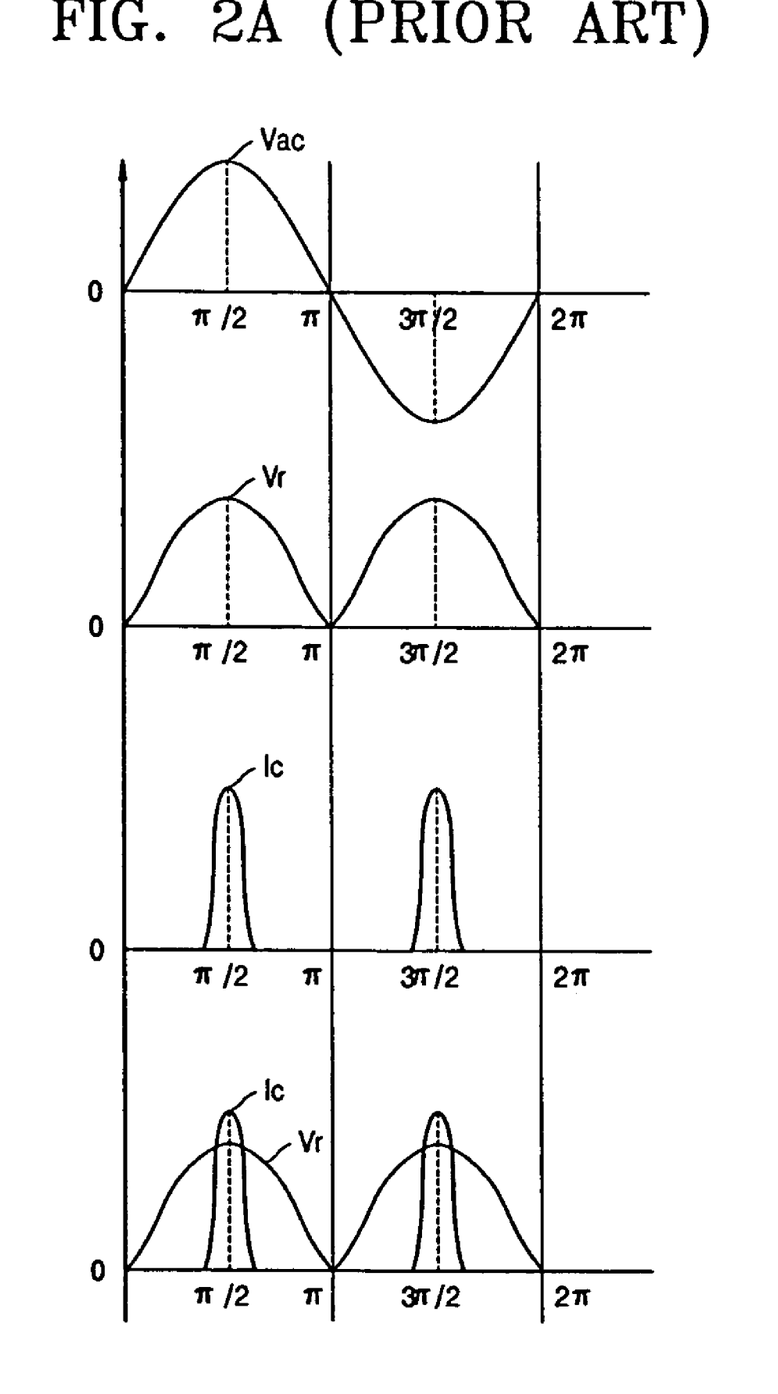
FIGS. 2A and 2B are graphs schematically showing waveforms of operations in the apparatus shown in FIG. 1.
Figure 2B:
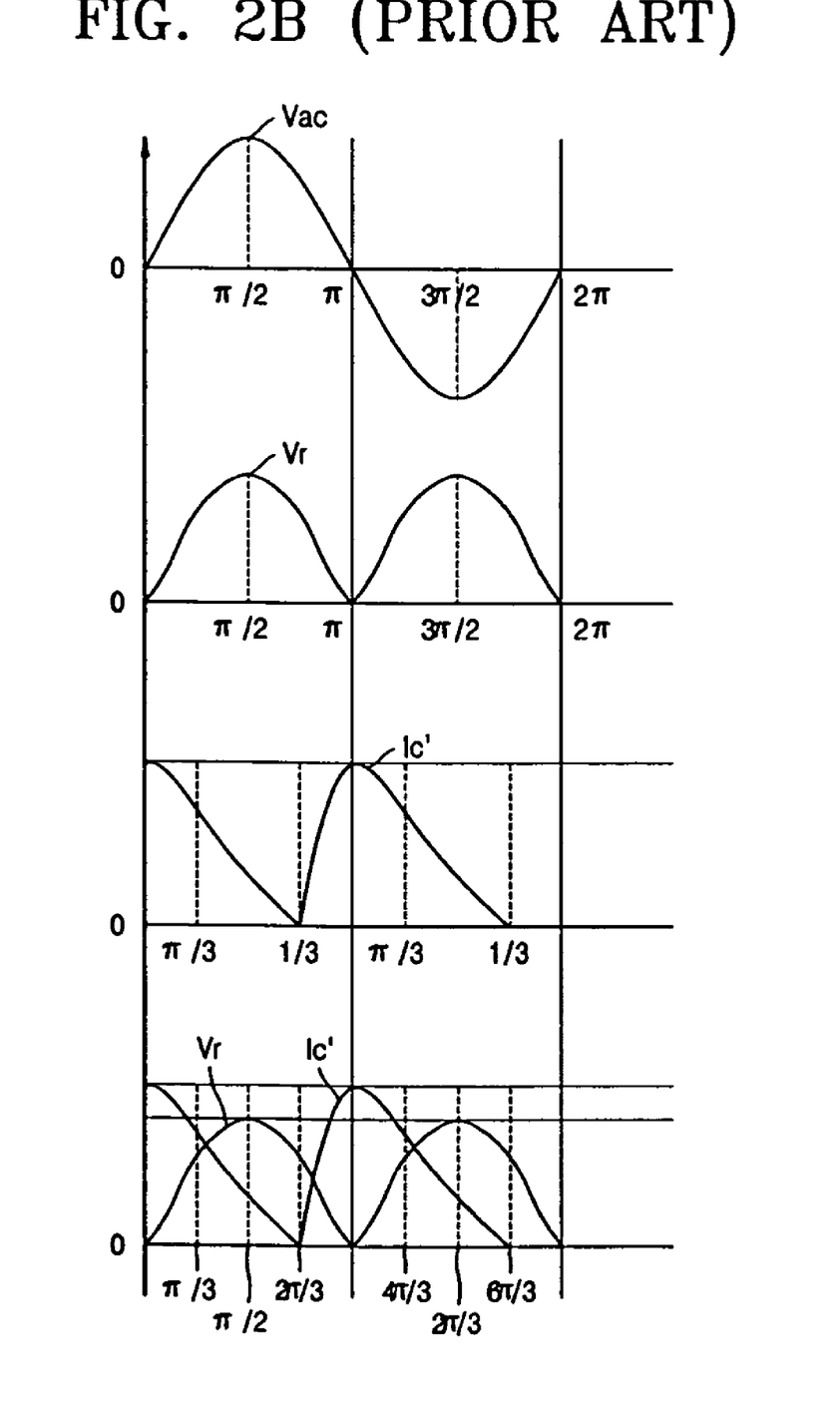

FIGS. 2A and 2B are graphs schematically showing a waveform of operations in the apparatus shown in FIG. 1. FIG. 2A illustrates a charging current Ic in a case that there is no inductor, and FIG. 2B illustrates a charging current Ic' in a case that there is an inductor.

In the case that there is no inductor, the charging current Ic flows only when a voltage Vr applied to the smoothing capacitor C exceeds a charging voltage Vac of the smoothing capacitor C. As shown in FIG. 2A, a pulse-shaped large current flows only near a peak value of an input voltage, that is, near phases of $\pi/2$ to $3\pi/2$ of the input voltage. A power factor is lowered and, many kinds of current of harmonics are induced by the pulse-shaped large current.

Such a passive power factor correction circuit is widely used in a field of handling a low-band frequency, a low EMI, and a high power.

Figure 3:
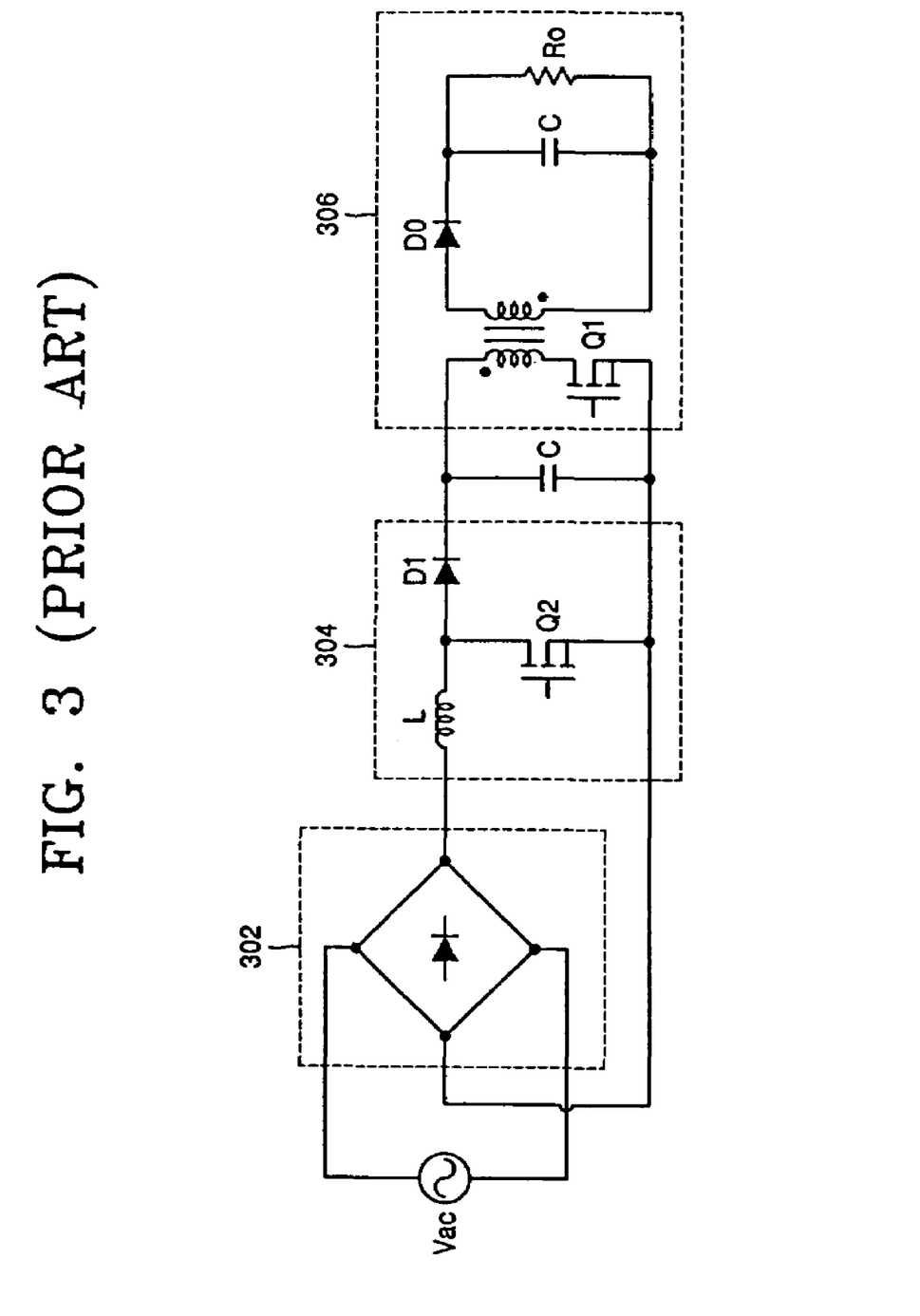
FIG. 3 is a block diagram showing a power supply to which a conventional active power factor correction circuit is applied.

FIG. 3 is a block diagram showing a power supply to which a conventional active power factor correction circuit is applied. In the power supply shown in FIG. 3, a waveform of an input current rectified by a rectifier 302 is changed to be similar to a sinusoidal waveform by using a semiconductor switch Q2, thereby making a phase of the rectified input current equal to a phase of an input voltage. A two-stage power factor correction circuit is chiefly used as an active power factor correction circuit. Here, a rectifying portion of an existing switching power supply is replaced by a power factor correction circuit 304 as a pre-regulator, and DC-DC conversion is performed by using a post-stage regulator 306. That is, since the active power factor correction circuit maintains a high power factor within a broad input voltage range, the active power function correction circuit is appropriate for devices which form a multiple output, require insulation, and need high precision.

The conventional power factor correction devices shown in FIGS. 1 and 3, use an inductor L to enhance power factor correction. Thus, such an inductor L used in the power supplies should be an inductor having a large inductance to enhance the power factor correction since the inductor should be designed to correspond to a frequency of an input AC voltage, such as a frequency of a commercial AC voltage which is 50 Hz or 60 Hz. Accordingly, the inductor used in a power factor correction device becomes large in shape and weight and high in price. Also, the power factor correction devices which use the inductor L has a power factor correction effect which is greatly influenced by variation of an input voltage and current and variation of an output voltage and current, and a very large power is consumed in a linear regulator corresponding to a post stage of the power factor correction stage.

SUMMARY OF THE INVENTION

In order to solve the foregoing and/or other problems, it is an aspect of the present general inventive concept to provide a power factor correction method of correcting a power factor in a power supply which rectifies an input alternating-current (AC) voltage and smoothes the same using a capacitive input type smoothing circuit in order to supply a direct-current (DC) voltage the power factor correction method including providing the rectified voltage to a smoothing circuit in synchronization with the input AC voltage in a switching manner, so that power factor correction and characteristics of harmonics are enhanced.

It is another aspect of the present general inventive concept to provide a power factor correction apparatus appropriate for the above power factor correction method.

Additional aspects and advantages of the present general inventive concept will be set forth in part in the description which follows and, in part, will be obvious from the description, or may be learned by practice of the general inventive concept.

The foregoing and/or other aspects of the present general inventive concept may be achieved by providing a power factor correction apparatus to correct a power factor in a power supply which smoothes an input alternating-current (AC) voltage via a capacitive input type smoothing circuit and stabilizes the smoothed direct-current (DC) voltage via a linear regulator, the power factor correction apparatus providing the rectified voltage to a smoothing circuit in a switching manner, so that power factor correction and characteristics of harmonics are enhanced.

The foregoing and/or other aspects of the present general inventive concept may be achieved by providing a power factor correction method of correcting a power factor in a power supply which rectifies an input alternating-current (AC) voltage and smoothes the same via a capacitive input type smoothing circuit in order to supply a direct-current (DC) voltage, the power factor correction method including rectifying the input AC voltage, cutting off a pulsating current generated in the rectifying operation at phases of about $\pi/2$ and, $3\pi/2$ of the input AC voltage so that the pulsating current is not transferred to a smoothing circuit, and smoothing the pulsating current generated in the cutting-off operation.

The foregoing and/or other aspects of the present general inventive concept may be achieved by providing a power factor correction apparatus to correct a power factor in a power supply which smoothes an input alternating-current (AC) voltage via a capacitive input type smoothing circuit and stabilizes the smoothed direct-current (DC) voltage, the power factor correction apparatus including an AC voltage transformer which transforms the input AC voltage and outputs the transformed result, a rectifier which rectifies the AC voltage provided from the AC voltage transformer, a switch which is inserted between the rectifier and the smoothing circuit, a pulse generator which generates a pulse signal in synchronization with the input AC voltage applied to the AC voltage transformer, and a switching controller which generates a switching control signal to control the switch, so that a pulsating current output from the rectifier is not transferred to the smoothing circuit in response to the pulse signal applied from the pulse generator at phases of about $\pi/2$ and $3\pi/2$ of the input AC voltage.

The foregoing and/or other aspects of the present general inventive concept may also be achieved by providing a power factor correction apparatus to correct a power factor in a power supply which smoothes an input alternating-current (AC) voltage via a capacitive input type smoothing circuit and stabilizes the smoothed direct-current (DC) voltage, the power factor correction apparatus including an AC voltage transformer which transforms the input AC voltage and outputs the transformed result, a rectifier which rectifies the AC voltage provided from the AC voltage transformer, a switch which is inserted between the rectifier and the smoothing circuit, a pulse generator which generates a pulse signal in synchronization with the input AC voltage applied to the AC voltage transformer, and a switching controller which generates a switching control signal to control the switch, so that a pulsating current output from the rectifier is not transferred to the smoothing circuit at phases of about $\pi/2$ and $3\pi/2$ of the input AC voltage in response to the pulse signal applied from the pulse generator.

The foregoing and/or other aspects of the present general inventive concept may also be achieved by providing a power supply which smoothes an input alternating-current (AC) voltage via a capacitive input type smoothing circuit and stabilizes the smoothed direct-current (DC) voltage via a linear regulator, the power supply including an AC voltage transformer which transforms the input AC voltage and outputs the transformed result, a rectifier which rectifies the AC voltage provided from the AC voltage transformer, a switch which is inserted between the rectifier and the smoothing circuit, a pulse generator which generates a pulse signal in synchronization with the input AC voltage applied to the AC voltage transformer; and a switching controller which generates a switching control signal to control the switch, so that a pulsating current output from the rectifier is not transferred to the smoothing circuit at phases of about $\pi/2$ and $3\pi/2$ of the input AC voltage, and a drop-out detector which detects a voltage difference between both ends of the linear regulator and supplies a drop-out signal as the detected result to the switching controller, wherein the switching controller generates the switching control signal which controls the switch in response to the pulse signal applied from the pulse generator and the drop-out signal provided from the drop-out detector.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 4:
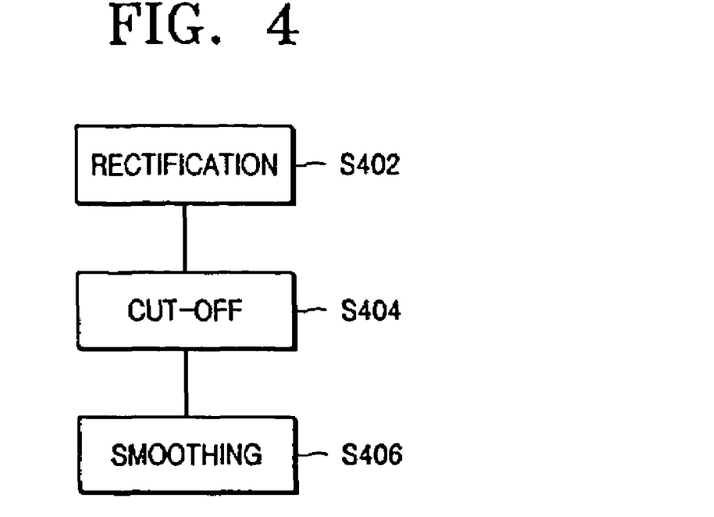
FIG. 4 is a flowchart showing a power factor correction method according to an embodiment of the present general inventive concept.

FIG. 4 is a flowchart showing a power factor correction method according to an embodiment of the present general inventive concept.

The power factor correction method shown in FIG. 4 may include a rectification process S402, a cut-off process S404, and a smoothing process S406.

In the rectification process S402, an alternating-current (AC) voltage provided from an AC voltage transformer can be rectified. The rectification process S402 can be performed by a conventional bridge rectifier, such as a rectifier 302 of FIG. 3.

Meanwhile, when the AC voltage is transformed via an AC voltage transformer, a leakage inductance of the AC voltage transformer can be controlled to reduce harmonics of an input current of the AC voltage. Power factor correction and reduction of harmonics can be achieved by current phase delay and energy charging characteristics of the leakage inductance in the AC voltage transformer. As described above, an excellent power factor correction effect can be obtained without using a separate inductor by using a leakage inductance characteristic of the AC voltage transformer.

In the cut-off process S404, the pulsating current obtained in the rectification process S402 can be cut off from the rectified voltage at phases of about $\pi/2$ and $3\pi/2$ of the input AC voltage. That is, the pulsating current having a phase only in the range between $2\pi/3$ and $4\pi/3$ and between $6\pi/3$ and $\pi/3$ can pass through the switching unit, so that the pulsating current obtained in the rectification process S402 is cut off from the rectified voltage at phases of about $\pi/2$ and $3\pi/2$ of the input AC voltage. In the cut-off process S404, a switch of the switching unit can be inserted between the rectifier and the smoothing circuit. The switch can be electrically conducted only when the phase of the pulsating current is in the range between $2\pi/3$ and $4\pi/3$ and between $6\pi/3$ and $\pi/3$ of the input AC voltage.

In the smoothing process S406, the pulsating current cut off in the cut-off process S404 can be smoothed. The smoothing process S406 can be performed by a capacitive input type smoothing circuit.

EMI (Electromagnetic Interference) can occur from all electromagnetic signals which radiate at a place having no obstacles and conduct along power or signal lead wires, or other things which radiate. This EMI can obstruct wired or wireless navigation or other safety service functions, and can impede radio communications services severely or interrupts them continuously.

Recently, in Europe and Japan, regulations for restricting noise of harmonics generated from power supplies are established in effect as a part of an administrative action which suppresses an electromagnetic wave environmental pollution which may cause harm to humans. Such an electromagnetic wave pollution prevention act tends to be further extended.

For example, EN 61000-3-2 which is a protective regulation for EMC (Electromagnetic Compatibility) which means a capability representing whether a number of electronic devices operate well together in European Union, restricts inflow and variation of a voltage in a power supply for use in an apparatus whose maximum rating current is equal to or less than 16 A. Here, devices are classified into Class A, Class B, Class C and Class D, respectively, according to an input power, the kind of the device used, and a waveform of an input current. General information equipment is classified into Class D.

Figure 5:
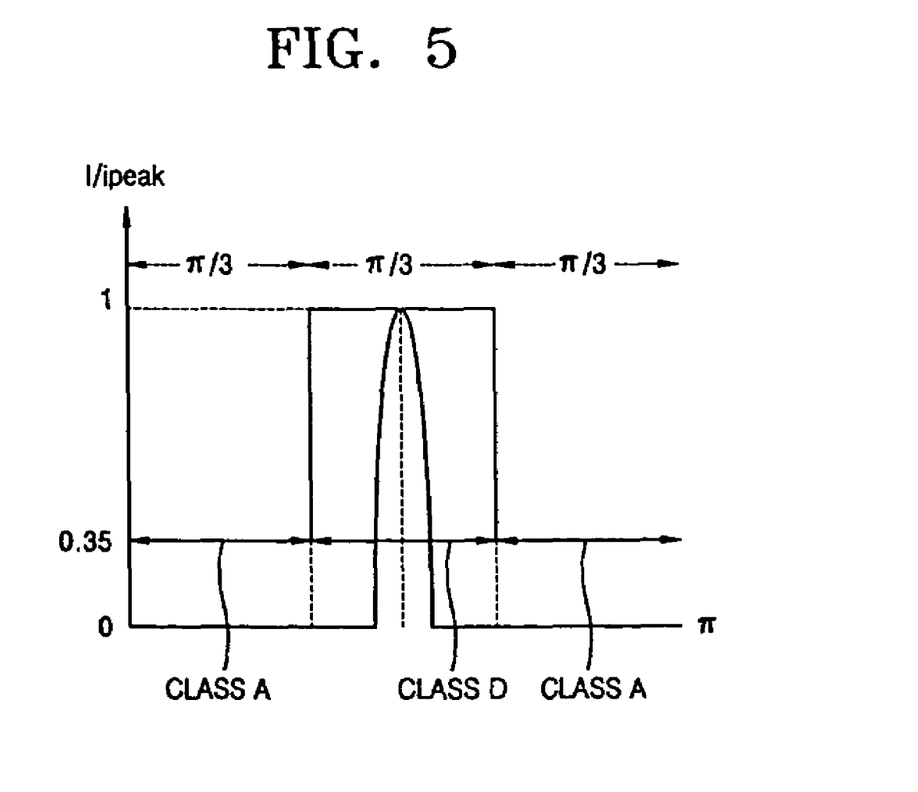
FIG. 5 a view schematically showing sections of Class A and Class D.

FIG. 5 schematically shows sections of Class A and Class D. In FIG. 5, a half wave of an input AC voltage, that is, only a wave of the input AC voltage in a range of 0 to $\pi$, is illustrated. Here, another half wave of the input AC voltage in a range of $\pi$ to $2\pi$ can be determined based on the half wave shown in FIG. 5.

As shown in FIG. 5, Class D is applied in a case that a peak envelop of the input rent exists near the phase of $\pi/2$, that is, within $\pi/3$ to $2\pi/3$. Otherwise, Class A is applied.

Table 1 illustrates restrictions on standard Class A and Class D defined in EN 61000-3-2.

TABLE 1

| EN61000-3-2 Harmonics Number | Class A mA/W | Class D mA/W |
| --- | --- | --- |
| 3 | 2300 | 3.4 |
| 5 | 1140 | 1.9 |
| 7 | 770 | 1.0 |
| 9 | 400 | 0.5 |
| 11 | 330 | 0.35 |

In Table 1, the left column indicates the number of orders of harmonics, the middle column indicates a fixed value as a standard value of Class A, and the right column indicates a variable value, which varies proportionally according to an input power as a standard value of Class D.

For example, in a case of the third harmonics, Class A needs to 2300 mA at maximum per Watt irrespective of the input power, but Class D should meet 3.4 mA at maximum per Watt. In a case that the input power is 600 W, which is a maximum applied value, since Class A is less than 2300 mA but Class D is 2040 mA, it can be seen that Class A has more advantages than Class D when being applied to the device used as the power supply.

In the power factor correction method according to an aspect of the present general inventive concept, the peak envelop of the input current cannot be formed at phases of about $\pi/3$ and $2\pi/3$ of the input AC voltage, but is formed in a range of $2\pi/3$ to $4\pi/3$ and $6\pi/3$ to $\pi/3$. Accordingly, class D can be applied to the power supplies which adopt the power factor correction method according to this embodiment the present general inventive concept, since Class D of EN 61000-3-2 is not more restrictive than Class A.

In the power factor correction method according to another aspect of the present general inventive concept, a charging current applied to the smoothing circuit by the leakage inductance in the AC voltage transformer can continuously flow even at a zero crossing point of the input AC voltage. Here, a peak envelop of the charging current may not be formed at phases of $\pi/2$ and $3\pi/2$ of the input AC voltage, but is formed at phases of about $\pi/3$, $2\pi/3$, $4\pi/3$ and $6\pi/3$. Accordingly, a power factor can be corrected and then a current of harmonics can be reduced.

Also, the power factor correction method according to another aspect of the present general inventive concept may not use an inductor which has been used in the conventional power factor correction apparatus, but may use a leakage inductance characteristic in the AC voltage transformer. Accordingly, a power supply whose price burden is small and whose power factor is corrected can be implemented.

Figure 6:
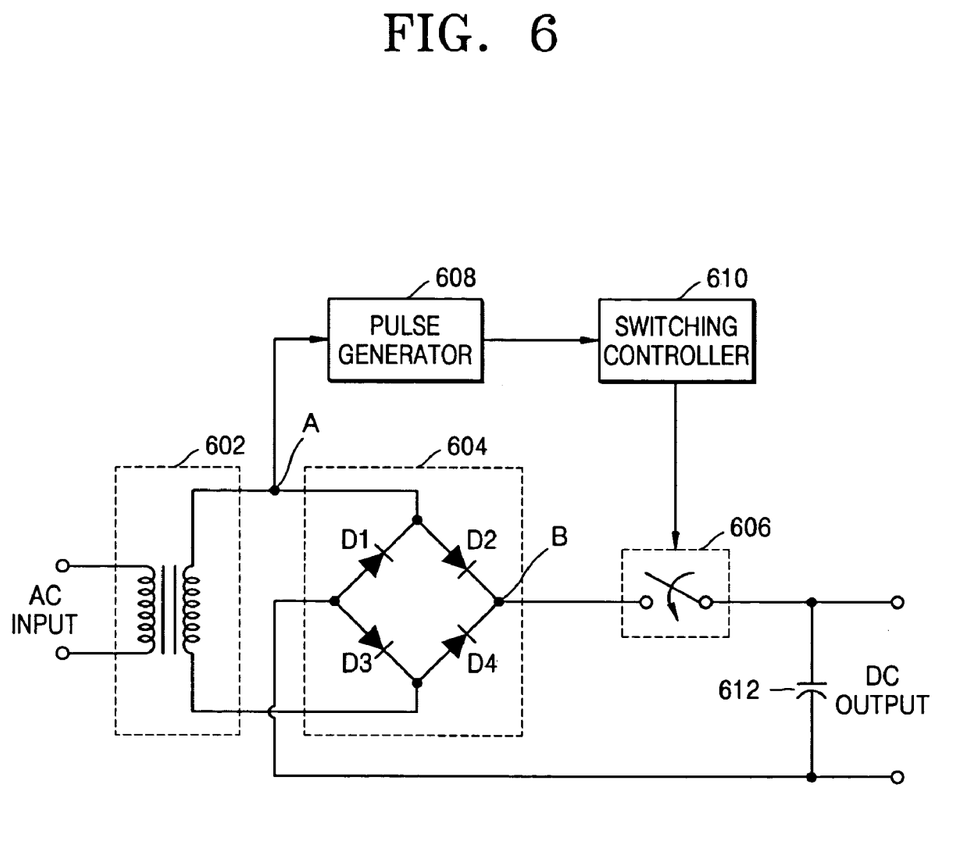
FIG. 6 is a block diagram showing a power factor correction apparatus according to another embodiment of the present general inventive concept.

FIG. 6 is a block diagram showing a power factor correction apparatus according to another embodiment of the present general inventive concept.

The power factor correction apparatus of FIG. 6 may include an AC voltage transformer 602, a rectifier 604, a switch 606, a pulse generator 608, a switching controller 610, and a smoothing circuit 612.

The AC voltage transformer 602 can transform an input AC voltage and outputs the transformed result. The AC voltage transformer 602 can be designed to have a leakage inductance so that a peak envelop of a waveform of current provided to the smoothing circuit 612 is not generated at phases of about $\pi/2$ and $3\pi/2$ of the input AC voltage, but is formed at phases within a range of $2\pi/3$ to $4\pi/$'and $6\pi/3$ to $\pi/3$. Here, the leakage inductance can be selected according to conditions of an input voltage and current and an output voltage and current.

The rectifier 604 can rectify an AC voltage provided from the AC voltage transformer 602.

The switch 606 can be inserted between the rectifier 604 and the smoothing circuit 612, and a switching operation of the switch 606 can be controlled by the switching controller 610.

The pulse generator 608 can detect a zero crossing point of the input AC voltage applied to the AC voltage transformer 602, can generate a pulse signal in synchronization with the detected zero crossing point, and can supply the generated pulse signal to the switching controller 610.

The switching controller 610 can generate a switching control signal to control the switch 606, so that a pulsating current output from the rectifier 604 is not transferred to the smoothing circuit 612 at phases of about $\pi/2$ and $3\pi/2$ of the input AC voltage in response to the pulse signal applied from the pulse generator 608, that is, the pulse signal generated at the detected zero crossing point of the transformed input AC voltage, but is transferred to the smoothing circuit 612 at phases only in the range of $2\pi/3$ to $4\pi/3$ and $6\pi/3$ to $\pi/3$. According to an aspect of this embodiment, the switching control signal may be a pulse width modulation (PWM) signal which can regulate a voltage applied to the smoothing circuit 612.

FIGS. 7A to 7F are graphs schematically showing waveforms generated during operations of the apparatus shown in FIG. 6.

Figure 7A:
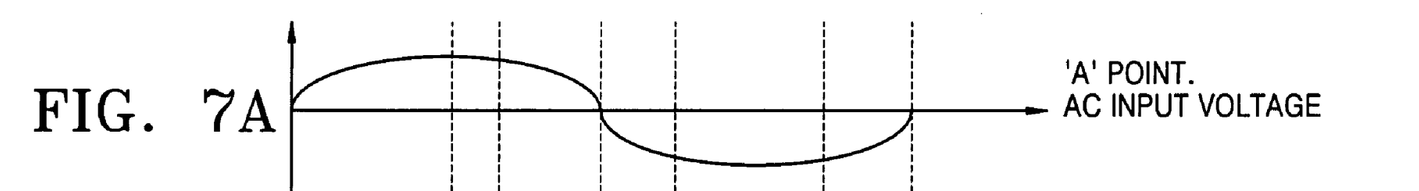
FIGS. 7A through 7F are graphs schematically showing waveforms generated during operations in the apparatus shown in FIG. 6.
Figure 7B:
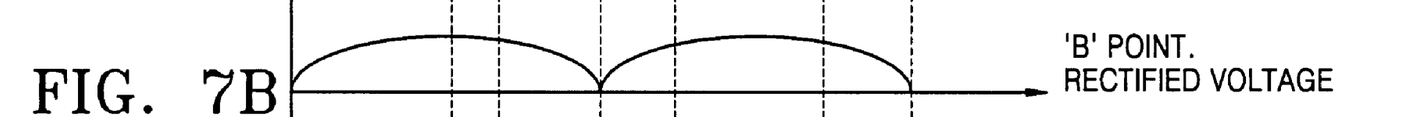
Figure 7C:
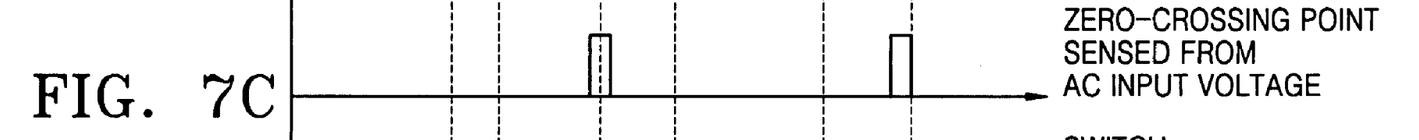
Figure 7D:
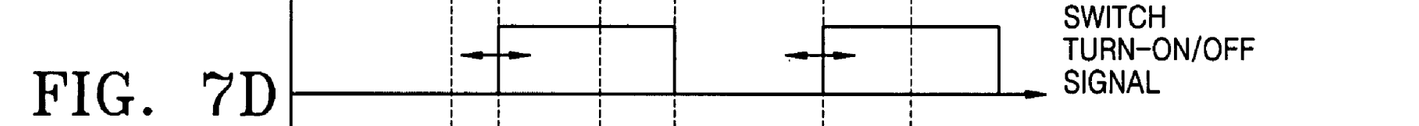
Figure 7E:
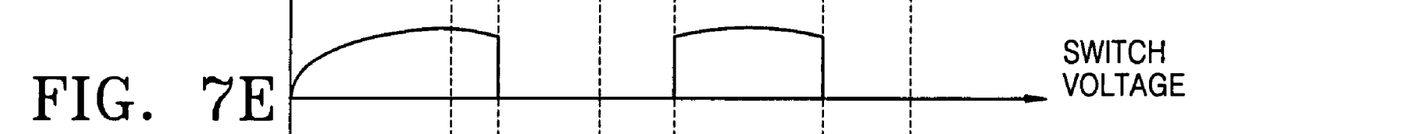
Figure 7F:
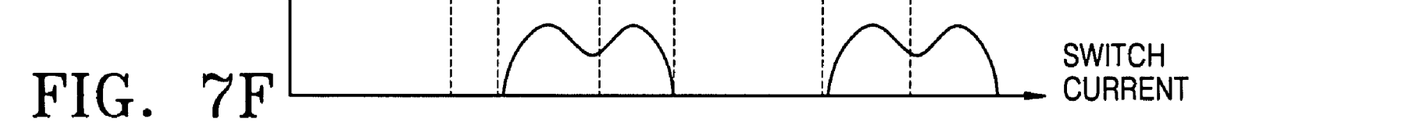

FIG. 7A shows the transformed input AC voltage supplied from the AC voltage transformer 602 at an 'A' point of FIG. 6. FIG. 7B shows a full-wave rectified signal output from the rectifier 604 at a 'B' point of FIG. 6. FIG. 7C shows the pulse signal generated from the pulse generator 608 at the zero crossing point of the transformed input AC voltage. FIG. 7D shows the switching control signal (switch turn-on/off signal) generated from the switching controller 610. FIG. 7E shows variation of a voltage applied across the switch 606. FIG. 7F shows a current flowing through the switch 606.

In FIG. 7F, the current flowing at the zero crossing point of the transformed input AC voltage, that is, at the phase of $\pi$ of the input AC voltage, can be caused by the leakage inductance of the AC voltage transformer 602.

Referring to FIGS. 7A to 7F, the current applied to the smoothing circuit 612 can continuously flow even at the zero crossing point of the transformed input AC voltage. Here, the peak envelop of the current cannot be formed at phases of $\pi/2$ and $3\pi/2$ of the input AC voltage, but is formed within a range of $2\pi/3$ to $4\pi/3$ and $6\pi/3$ to $\pi/3$. Accordingly, it can be seen that a power factor can corrected and then current of harmonics can be reduced.

Figure 8:
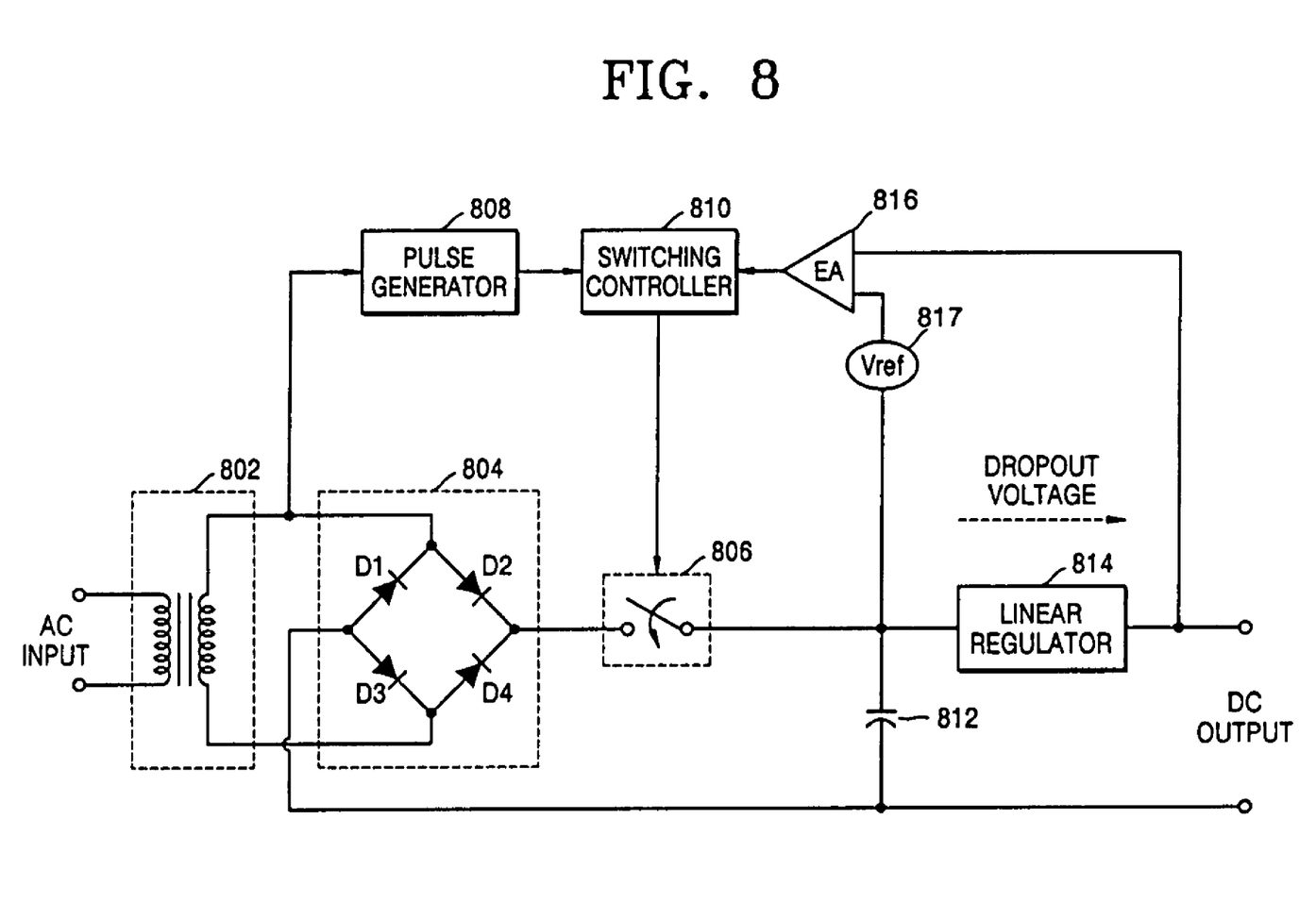
FIG. 8 is a block diagram showing a direct-current power supply according to another embodiment of the present general inventive concept.

FIG. 8 is a block diagram showing a direct-current (DC) power supply according to another embodiment of the present general inventive concept.

The power supply of FIG. 8 may include an AC voltage transformer 802, a rectifier 804, a switch 806, a pulse generator 808, a switching controller 810, a smoothing circuit 812, a linear regulator 814, and a drop-out detector 816.

Since operations of the AC voltage transformer 802, the rectifier 804, the switch 806, the pulse generator 808, and the smoothing circuit 812 of FIG. 8 are same as those of FIG. 6, the detailed description thereof will be omitted.

The linear regulator 814 can regulate an unstable voltage and current generated from the rectifier 804 to be maintained constant irrespective of change of the input voltage and current or the output loads.

The linear regulator 814, applied to the DC power supply of FIG. 8 and connected to the switch 806 in series, can absorb a difference between the input voltage and the output voltage. As a result, the voltage difference, called a drop-out, can exist at both ends of the linear regulator 814.

The drop-out varies according to variation of the input AC voltage and variation of the load current. However, the drop-out should be minimized.

This power supply shown in FIG. 8 can detect a size of the drop-out and can output the detected drop-out back to the switching controller 810 to thereby control a voltage to be applied to the smoothing circuit 812. The size of the drop-out can be detected by the drop-out detector 816.

The drop-out detector 816 can detect a difference between the voltage difference between both ends of the linear regulator 814 and a reference voltage (Vref) 817 to provide the detected difference to the switching controller 810. Here, the reference voltage Vref can be determined as a value appropriate to be absorbed in the linear regulator 814 and can be smaller than a maximum drop-out.

The switching controller 810 can generate a switching control signal whose pulse width can vary according to a size of an error provided from the drop-out detector 816, and can provide the generated switching control signal to the switch 806.

The switching controller 810 can control a conducting range (timing) of the switch 806 so that a period of time of a voltage to be applied to the smoothing circuit 812 becomes extended or shortened according to the size of the error provided from the drop-out detector 816.

The voltage output from the smoothing circuit 812 can be maintained as a value similar to the voltage output from the linear regulator 814, that is, a value obtained by adding the reference voltage to the output voltage of the linear regulator 814, under a switching control operation of the switching controller 810. Accordingly, a power consumption of the linear regulator 814 can be maintained minimum.

Figure 9:
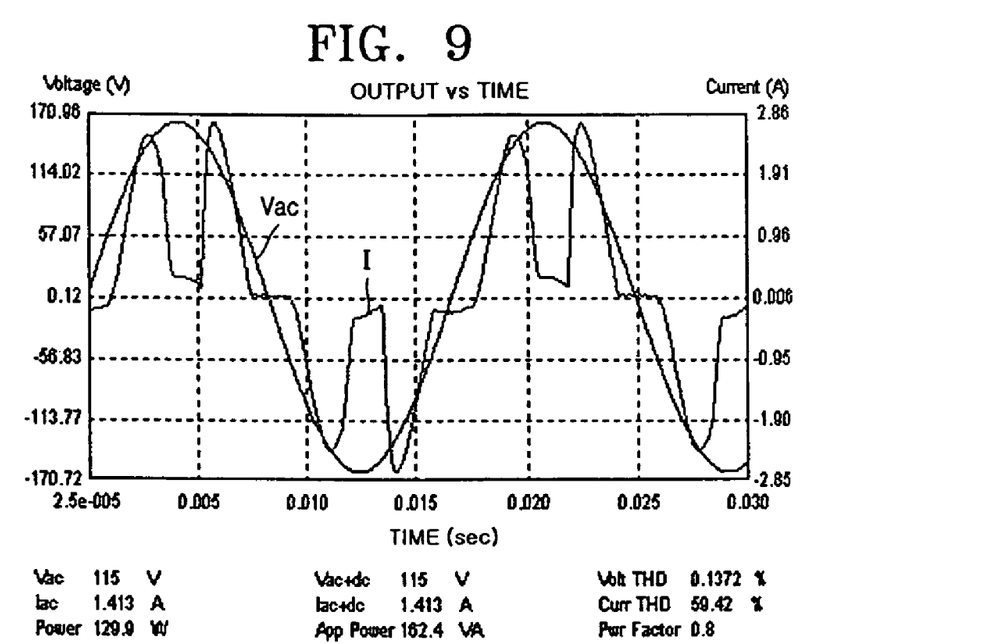
FIG. 9 is a graph showing a waveform which indicates a power factor correction effect in the apparatus shown in FIG. 8.

FIG. 9 is a graph showing a waveform which indicates a power factor correction effect in the apparatus shown in FIG. 8. As shown in FIG. 9, the peak envelop of the current can not be formed at phases of $\pi/2$ and $3\pi/2$ of the input AC voltage, but is formed at phases within a range of $2\pi/3$ to $4\pi/3$ and $6\pi/3$ to $\pi/3$. Accordingly, it can be seen that a power factor can be corrected and then current of harmonics can be reduced.

Figure 10:
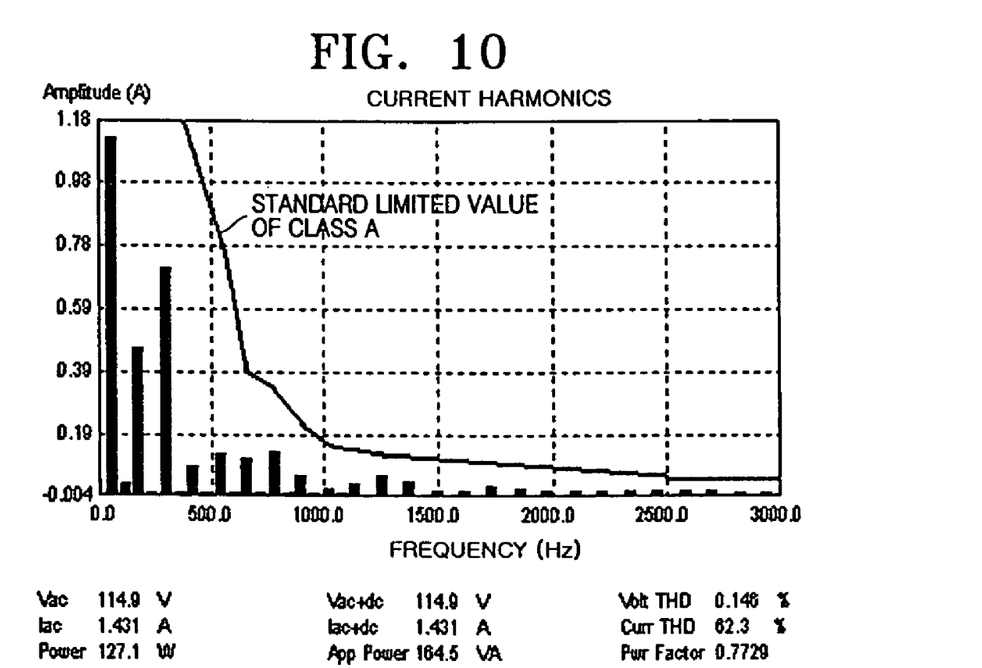
FIG. 10 is a graph showing a waveform which indicates a harmonic enhancement effect in the apparatus shown in FIG. 8.

FIG. 10 is a graph showing a waveform which indicates a harmonics enhancement effect in the apparatus shown in FIG. 8. In the graphs of FIG. 10, a vertical axis indicates current values, and a horizontal axis indicates harmonics. As shown in FIG. 10, it can be seen that harmonics can be suppressed sufficiently to meet a standard limited value of Class A which is indicated as a solid curve.

The power supply according an aspect of to the present general inventive concept may not use any inductor but may use a leakage inductance characteristic of an AC voltage transformer to provide an inexpensive power supply.

Also, the power supply according to another aspect of the present general inventive concept can minimize the drop-out of the linear regulator to reduce a size of a heat radiating plate and a size of a transistor which is used in the linear regulator. Accordingly, the embodiments of the present general inventive concept can provide a high integration power supply.

The present general inventive concept is not limited to the above-described embodiments. It is apparent to one who has an ordinary skill in the art that there may be many modifications and variations of the power supplies within the same technical spirit of the general inventive concept.

As described above, the power factor correction apparatus according to the present general inventive concept may not make the peak envelop of the current formed at phases of $\pi/2$ and $3\pi/2$ of the input AC voltage, thereby correcting a power factor and reducing a harmonics current. Also, the present general inventive concept can use a leakage inductance of an AC voltage transformer at maximum to provide an inexpensive power supply.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A power factor correction method of correcting a power factor in a power supply, the power factor correction method comprising:
   rectifying an input AC voltage;
   detecting a zero crossing point from the input AC voltage to generate a pulse signal;
   cutting off a pulsating current generated in the rectifying operation at phases of about $\pi/2$ and $3\pi/2$ of the input AC voltage from the rectified voltage according to the pulse signal so that the pulsating current is not transferred to a capacitive input type smoothing circuit; and
   smoothing the pulsating current generated from the cutting-off operation in the capacitive input type smoothing circuit to output a direct current (DC) voltage.

2. The power factor correction method of claim 1, wherein the cutting off of the pulsating current comprises allowing the pulsating current to passes in a phase range of $2\pi/3$ to $4\pi/3$ and $6\pi/3$ to $\pi 3$ of the input AC voltage.

3. The power factor correction method of claim 1, further comprising:
   controlling a leakage inductance of an AC voltage transformer to transform the input AC voltage so that harmonics of an input current of the input AC voltage is reduced.

4. A power factor correction apparatus to correct a power factor in a power supply comprising:
   an AC voltage transformer which transforms an input AC voltage and outputs the transformed AC voltage;
   a rectifier which rectifies the transformed AC voltage provided from the AC voltage transformer;
   a switch which is inserted between the rectifier and the smoothing circuit;
   a smoothing circuit which smoothes the rectified voltage;
   a pulse generator which generates a pulse signal in synchronization with the input AC voltage applied to the AC voltage transformer; and
   a switching controller which generates a switching control signal to control the switch, so that a pulsating current output from the rectifier is not transferred to the smoothing circuit in response to the pulse signal applied from the pulse generator at phases of about $\pi/2$ and $3\pi/2$ of the input AC voltage,
   wherein the switch comprises a first terminal connected to the rectifier and a second terminal connected to the smoothing circuit, and the switching controller connects and disconnects the first and second terminals in series with the rectifier and the smoothing circuit to control the switch.

5. The power factor correction apparatus of claim 4, wherein the switching controller generates the switching control signal so that the pulsating current passes through in a range of phases of $2\pi/3$ to $4\pi/3$ and $6\pi/3$ to $\pi/3$ of the input AC voltage.

6. The power factor correction apparatus of claim 4, wherein the AC voltage transformer has a leakage inductance which prevents a peak envelop of a current waveform provided to the smoothing circuit from being formed at phases of about $\pi/2$ and $3\pi/2$ of the input AC voltage.

7. The power factor correction apparatus of claim 6, wherein the AC voltage transformer has a leakage inductance which controls the peak envelope of the current waveform to be formed in a range of phases of $2\pi/3$ to $4\pi/3$ and $6\pi/3$ to $\pi/3$ of the input AC voltage.

8. The power factor correction apparatus of claim 4, wherein the pulse generator detects a zero crossing point of the input AC voltage to generate the pulse signal synchronized with the detected zero crossing point.

9. A power supply comprising:
   an AC voltage transformer which transforms an input AC voltage and outputs the transformed AC voltage;
   a rectifier which rectifies the transformed AC voltage provided from the AC voltage transformer;
   a smoothing circuit which smoothes the rectified voltage;
   a switch which is inserted between the rectifier and the smoothing circuit;
   a pulse generator which generates a pulse signal in synchronization with the input AC voltage applied to the AC voltage transformer;
   a switching controller which generates a switching control signal to control the switch, so that a pulsating current output from the rectifier is not transferred to the smoothing circuit at phases of about $\pi/2$ and $3\pi/2$ of the input AC voltage;
   a linear regulator to stabilize the smoothed DC voltage; and
   a drop-out detector which detects a voltage difference between both ends of the linear regulator and supplies the detected result as a drop-out signal to the switching controller,
   wherein the switching controller generates a switching control signal to control the switch in response to the pulse signal applied from the pulse generator and the drop-out signal provided from the drop-out detector.

10. The power supply of claim 9, wherein the drop-out detector detects a difference between the detected voltage difference and a predetermined reference value.

11. The power supply of claim 10, wherein the reference value is determined to correspond to a maximum drop-out which can be absorbed in the linear regulator.

12. The power supply of claim 9, wherein the switching controller generates the switching control signal whose pulse width varies according to a size of an error provided from the drop-out detector.

13. The power supply of claim 9, wherein the switching controller generates the switching control signal so that the pulsating current passes through the switch at phases of $2\pi/3$ to $4\pi/3$ and $6\pi/3$ to $\pi/3$ of the input AC voltage.

14. The power supply of claim 9, wherein the AC voltage transformer has a leakage inductance which prevents a peak envelop of a current waveform provided to the smoothing circuit from being formed at phases of about $\pi/2$ and $3\pi/2$ of the input AC voltage.

15. The power supply of claim 14, wherein the leakage inductance controls the peak envelop of the current waveform to be formed at phases of $2\pi/3$ to $4\pi/3$ and $6\pi/3$ to $\pi/3$ of the input AC voltage.

16. The power supply of claim 9, wherein the pulse generator detects a zero crossing point of the input AC voltage to generate the pulse signal synchronized with the detected zero crossing point.

17. A power factor correction apparatus used with a power supply, comprising:
a rectifier to rectify an input AC voltage;
a pulse generator to detect a zero crossing point from the input AC voltage to generate a pulse signal;
a switching unit to cut-off a pulsating current from the rectified voltage at a phase of about $\pi/2$ and $3\pi/2$ of the input AC voltage according to the pulse signal; and
a smoothing circuit to smooth the voltage having the cut-off pulsating current to output a DC voltage.

18. The power factor correction apparatus of claim 17, wherein the switching unit comprises a switch connected between the rectifier and the smoothing circuit to be turned on and off to selectively prevent the pulsating current from being transferred from the rectifier to the smoothing circuit.

19. The power factor correction apparatus of claim 17, further comprising:
a linear regulator to stabilize the smoothed voltage; and
a drop-out detector to detect a drop-out portion from the cut-off voltage and the smoothed voltage to output a drop-out signal,
wherein the switching unit selectively cuts-off the pulsating current according to the dropout signal.

20. A power factor correction apparatus used with a power supply, comprising:
a rectifier to rectify an input AC voltage;
a pulse generator to detect a zero crossing point from the input AC voltage to generate a pulse signal;
a smoothing circuit to smooth the rectified voltage; and
a switching unit having a first terminal and a second terminal disposed in series between an output of the rectifier and an input of the smoothing circuit to selectively transmit the rectified voltage to the smoothing circuit by connecting and disconnecting the first and second terminals according to the phase signal representing the zero crossing point of the input AC voltage.

21. The power factor correction apparatus of claim 20, wherein the switching unit selectively prevents a pulsating current of the rectified voltage from being transmitted to the smoothing circuit according to a comparison between the rectified voltage and the smoothed voltage.

22. The power factor correction apparatus of claim 20, wherein the phase of the input AC voltage corresponds to $\pi/2$ and $3\pi/2$ phases of the input AC voltage.

23. The power factor correction apparatus of claim 20, wherein the phase of the input AC voltage corresponds to a zero-crossing point of the input AC voltage.

24. A power correction method of correcting a power factor in a power supply, the method comprising:
transforming an input source to output an input AC voltage;
rectifying the transformed AC voltage in a rectifier;
smoothing the rectified voltage in a smoothing circuit;
generating a pulse signal in synchronization with a phase of the input AC voltage; and
generating a switching control signal to control a switch connected between the rectifier and the smoothing circuit, so that a pulsating current output from the rectifier is not transferred to the smoothing circuit in response to the pulse signal such that a first peak envelope of the pulsating current is formed between phases of $2\pi/3$ to $4\pi/3$ of the input AC voltage and a second peak envelope of the pulsating current is formed between phases of $6\pi/3$ to $\pi3$ of the input AC voltage.

25. The method of claim 24, wherein the phase of the input AC voltage corresponds to phases of about $\pi/2$ and $3\pi/2$ of the input AC voltage.

26. The method of claim 25, further comprising:
stabilizing the smoothed voltage in a linear regulator; and
detecting a voltage difference between both ends of the linear regulator to supply a drop-out signal to control the switch in response to the pulse signal and the drop-out signal.

27. The power factor correction apparatus of claim 17, wherein the switching unit comprises a first terminal connected to the rectifier and a second terminal connected to the smoothing circuit, and the switching unit connects and disconnects the first and second terminals in series with the rectifier and the smoothing circuit.

28. The power factor correction method of claim 24, wherein the generating of the switching control signal comprises generating a control signal to close the switch around each zero crossing point of the input AC voltage such that the switch is closed twice during each cycle of the input AC voltage.

29. A power factor correction apparatus used with a power supply, comprising:
a rectifier to rectify an input AC voltage;
a pulse generator to detect a zero crossing point from the input AC voltage to generate a pulse signal:
a switching unit to selectively cut-off and transmit a pulsating current from the rectified voltage according to the pulse signal representing a period including the zero crossing point of the input AC voltage such that the pulsating current is transmitted around each zero crossing point more than once during a period of the input AC voltage, and the pulsating current is cut-off in between each zero crossing point more than once during the period of the input AC voltage; and
a smoothing circuit to smooth the voltage having the cut-off pulsating current to output a DC voltage.

* * * * *